United States Patent
Morovic et al.

(10) Patent No.: US 10,750,057 B2
(45) Date of Patent: Aug. 18, 2020

(54) SETTING INK USE LIMITS FOR A PRINTING SYSTEM

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,655

(22) PCT Filed: Oct. 24, 2016

(86) PCT No.: PCT/US2016/058498
§ 371 (c)(1),
(2) Date: Mar. 21, 2019

(87) PCT Pub. No.: WO2018/080428
PCT Pub. Date: May 3, 2018

(65) Prior Publication Data
US 2019/0281191 A1 Sep. 12, 2019

(51) Int. Cl.
*H04N 1/60* (2006.01)
*B41J 2/21* (2006.01)

(52) U.S. Cl.
CPC .............. *H04N 1/605* (2013.01); *B41J 2/21* (2013.01); *B41J 2/2132* (2013.01);
(Continued)

(58) Field of Classification Search
None
See application file for complete search history.

(56) References Cited

U.S. PATENT DOCUMENTS

| 5,553,199 A | 9/1996 | Spaulding et al. |
| 6,776,473 B2 | 8/2004 | Huang et al. |

(Continued)

FOREIGN PATENT DOCUMENTS

| CN | 101401412 A | 4/2009 |
| CN | 101544127 A | 9/2009 |

(Continued)

OTHER PUBLICATIONS

Deshpande, K.; "N-colour Separation Methods for Accurate Reproduction of Spot Colours" May 2015; http://ualresearchonline.arts.ac.uk/8732/1/Deshpande-PhD-thesis-2015.pdf.

*Primary Examiner* — Barbara D Reinier
(74) *Attorney, Agent, or Firm* — HP Inc. Patent Department

(57) ABSTRACT

An example method of setting ink limits for a printing system is described. The method involves printing a first set of color ramps. Each color ramp has test areas which are printed based different Neugebauer Primary Area Coverage (NPac) vectors. A test area for each color ramp is indicated that meets an image quality metric and Neugebauer Primary ink use limits are set based on these test areas. A second set of color ramps, for combinations of the set of available Neugebauer Primaries, is then printed, The test areas for each ramp are defined by monotonically-varying vector element values for one Neugebauer Primary in a combination and the second set of ramps are defined by monotonically-varying vector element values across said ramps for another Neugebauer Primary in the combination. Test areas are then indicated again for the second set of color ramps to set ink use limits for the printing system.

20 Claims, 8 Drawing Sheets

(52) U.S. Cl.
CPC ......... *H04N 1/6033* (2013.01); *H04N 1/6041* (2013.01); *H04N 1/6052* (2013.01); *H04N 1/6075* (2013.01)

(56) References Cited

U.S. PATENT DOCUMENTS

| | | | |
|---|---|---|---|
| 6,848,768 | B2 | 2/2005 | Roberts |
| 7,342,593 | B2 | 3/2008 | Agar |
| 7,742,204 | B2 | 6/2010 | Kuehn et al. |
| 7,990,592 | B2 | 8/2011 | Mestha et al. |
| 8,213,055 | B2 * | 7/2012 | Morovic .............. H04N 1/6016 358/2.1 |
| 8,270,032 | B2 * | 9/2012 | Benedicto ............ H04N 1/6058 358/1.9 |
| 8,363,273 | B2 * | 1/2013 | Morovic .............. H04N 1/6033 358/1.15 |
| 8,670,167 | B2 * | 3/2014 | Benedicto ............ H04N 1/6058 358/1.9 |
| 9,185,266 | B2 | 11/2015 | Edge |
| 9,256,815 | B1 * | 2/2016 | Morovic .............. H04N 1/6033 |
| 9,584,700 | B2 * | 2/2017 | Morovic |
| 9,609,177 | B2 * | 3/2017 | Morovic ................ H04N 1/603 |
| 9,674,403 | B2 * | 6/2017 | Morovic .............. H04N 1/6025 |
| 10,623,606 | B2 * | 4/2020 | Morovic .............. H04N 1/6033 |
| 2006/0139705 | A1 | 6/2006 | Piatt et al. |
| 2010/0085586 | A1 * | 4/2010 | Tin ....................... H04N 1/6033 358/1.9 |
| 2011/0096344 | A1 | 4/2011 | Morovic |
| 2015/0217587 | A1 | 8/2015 | Pous et al. |
| 2016/0034796 | A1 | 2/2016 | Morovic et al. |
| 2016/0255240 | A1 * | 9/2016 | Morovic ................ H04N 1/405 358/3.07 |
| 2019/0238723 | A1 * | 8/2019 | Morovic ................ B41J 2/525 |
| 2020/0036866 | A1 * | 1/2020 | Morovic ................ H04N 1/603 |

FOREIGN PATENT DOCUMENTS

| | | |
|---|---|---|
| CN | 101758665 A | 6/2010 |
| EP | 2989782 | 3/2016 |
| JP | 2016068358 A | 5/2016 |
| WO | WO-2009138182 | 11/2009 |

* cited by examiner

SETTING INK USE LIMITS FOR A PRINTING SYSTEM

BACKGROUND

Printing systems may be arranged to produce an image (in two or three dimensions—2D or 3D) based on input data. In certain printing systems, color data for the image may be represented in a first color space. For example, color data for the image may be represented in a Red, Green, Blue (RGB) color space.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
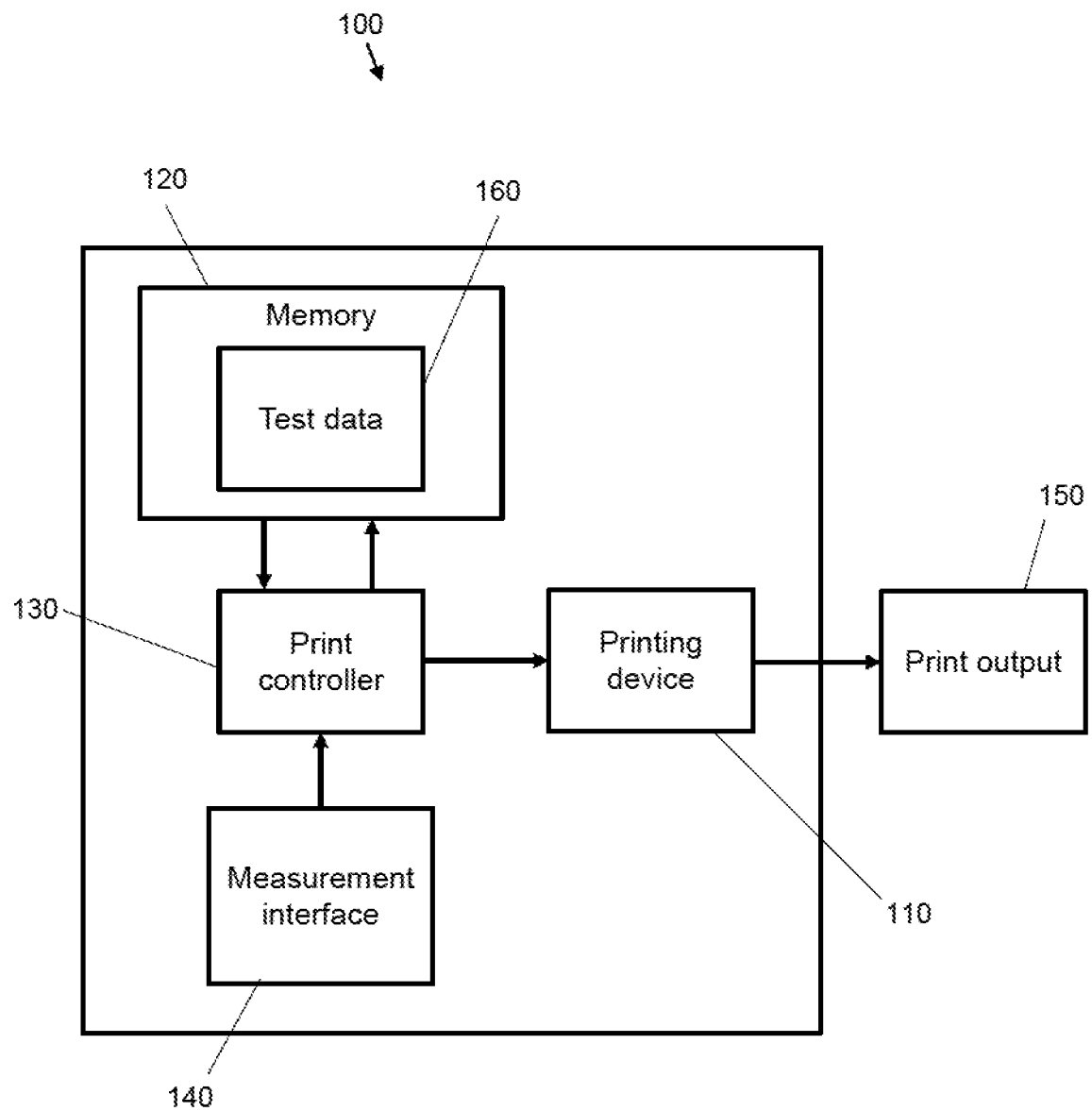
FIG. 1 is a schematic diagram showing a printing system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A printing system may have a limited number of output channels, such as available colorants. As such, it may be necessary to map color data to a second color space, defined by the available output channels, that is used to produce the output. Area coverage representations, such as Neugebauer Primary area coverages for example, may be used to implement this second color space. A color mapping may be used to map color data from a print job to the second color space.

Certain examples described herein relate to color calibration of a printing system. Color calibration may for example be used to adjust the color response of the printing system to more accurately correspond to a desired color to be printed. Color calibration may be used to calibrate a color mapping process by which a first representation of a given color is mapped to a second representation of the same color. Although "color" is a concept that is understood intuitively by human beings, it can be represented in a large variety of ways. For example, in one case, a color as observed visually by an observer may be related to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. Other color spaces include: a Cyan, Magenta, Yellow and Black (CMYK) color space, in which four variables are used in a subtractive color model to represent different quantities of colorant or ink, e.g. for a printing system; the International Commission on Illumination (CIE) 1931 XYZ color space, in which three variables ('X', 'Y' and 'Z' or tristimulus values) are used to model a color; the CIE 1976 (L*, a*, b*-CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of one or more Neugebauer Primary vectors over an area of a halftone. In a simple binary (bi-level, i.e. two drop states: "drop" or "no drop") printer, a Neugebauer Primary is one of $2^k$ combinations of k inks within the printing system. For example, if a printing device uses CMY inks there can be eight Neugebauer Primaries. These Neugebauer Primaries relate to the following: C, M, Y, C+M, C+Y, M+Y, C+M+Y, and W (white or blank indicating an absence of ink). As may be seen, a Neugebauer Primary may comprise an overprint of two available inks, such as a drop of Magenta on a drop of Cyan (for a bi-level printer) in a common addressable print area (e.g. a printable "pixel"). Other examples may also incorporate multi-level printers, e.g. where print heads are able to deposit N drop levels; in this case an Neugebauer Primary may include one of NA combinations of k inks within the printing system. An NPac space provides a large number of metamers. Metamerism is the existence of a multitude of combinations of reflectance and emission properties that result in the same perceived color for a fixed illuminant and observer.

Each NPac vector may therefore define the probability distribution for one or more colorant or ink combinations for each pixel in the halftone (e.g. a likelihood that a particular colorant or ink combination is to be placed at each pixel location in the halftone). In this manner, a given NPac vector defines a set of halftone parameters that can be used in the halftoning process to map a color to one or more NPac vectors to be statistically distributed over the plurality of pixels for a halftone. Moreover, the statistical distribution of Neugebauer Primaries to pixels in the halftone serves to control the colorimetry and other print characteristics of the halftone.

Spatial distribution of the Neugebauer Primaries according to the probability distribution specified in the NPac vector may be performed using any suitable halftoning methods as is known in the art. In this respect, examples of suitable halftoning methods include matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

Examples described herein relate to color calibration for printing based on NPacs, for example using a HANS pipeline. The color calibration may involve calibration of a color mapping from a device-dependent color space such as RGB or CMYK, for which a given color value may have a different perceived color when printed by different printing systems, to an NPac color space. Such examples will be described further below.

Printing systems may be configured to favor particular print attributes. For example, the print attributes may relate to, amongst others, color constancy, efficient use of output elements, robustness, and metamerism under a set of conditions. The use of area coverage representations enables one metamer, i.e. an output color value in an output color space, to be selected from a set of metamers to modify, e.g. optimize, one or more of these printing attributes. In one case, a particular output color value in the form of a NPac vector may be selected from a set of NPac vectors that map to a common input color value. For example, an area coverage representation in the form of an NPac vector may be selected to minimize a change in observed color of an image output when subject to variations in the printing system, i.e. on a basis of increased robustness. Area coverage representations may have a dimensionality defined by the number of available output elements (n) and a number of addressable states of each output element (k). In particular, there may be $k^n$ dimensions. For example, if a printing system uses four colorants (e.g. Cyan, Magenta, Yellow and black—CMYK) wherein each colorant may be deposited at one of three levels, an area coverage representation space may have $3^4=81$ dimensions. This may be contrasted with the n or four dimensions of a comparative colorant space and the three dimensions of an input tristimulus color space (such as a RGB or Commission Internationale de l'Éclairage (CIE) XYZ based color space).

Although a given input color value may map to more than one output color value (i.e. more than one NPac vector), some output color values may produce undesirable results. For example, for a given substrate type, depositing an excessive amount of a single colorant may cause damage to the substrate. Similarly, depositing an excessive amount of a combination of colorants may cause damage to the substrate. Even if excessive amounts of colorant do not cause significant damage to a substrate, their deposit may be inefficient, may cause inversions in the colorant-color relationship in which beyond a certain limit chroma is lost, or may introduce artefacts in the resulting image, such as graining, coalescence or mottle.

In order to mitigate these problems, ink use limits may be set for the printing system. The ink use limits may define a limit on the amounts of ink that can be deposited on a particular substrate. This may help to avoid putting down more ink than is necessary. It may also help to avoid issues in building resources (i.e. determining combinations of Neugebauer Primaries) during printing operations. "Percolorant" ink use limits may be set (i.e. for each ink channel) as well as total use ink limits (i.e. defined for combinations of ink channels). The methods described below relate to defining those ink use limits in respect of the output color values in the form of NPac vectors. This allows ink use limits to be defined over a full dimensionality of the area coverage representation space, side-by-side versus overprinted halftoning to be precisely controlled and a large range of choices for how to deposit a combination of inks.

Ink use limits may be defined in terms of an amount of ink. For example, this may be defined in terms of a particular mass or weight of ink for a given addressable area of print substrate, e.g. a print resolution pixel. In one case, an ink use limit may be 6 ng at a 1200 dpi resolution, meaning that the NPac vector should not use more than 6 ng per print resolution pixel. In such an example where a drop weight (i.e. the weight of each drop of ink) for each ink is 3 ng then for a Neugebauer primary that uses a single ink without overprinting can be printed at 100% area coverage since that weight (3 ng) is within the 6 ng ink use limit. Two drops can also be printed at 100% area coverage since the weight of the two drops (6 ng) is also within the 6 ng ink use limit. However, for a system that can print three drops per ink channel (i.e. a maximum weight of 9 ng per Neugebauer Primary), the ink channel can only be printed at 66.6% area coverage to be within the ink use limit (i.e. with 33.3% blank Neugebauer Primary).

FIG. 1 shows an example printing system 100. Certain examples described herein may be implemented within the context of this printing system.

In the example of FIG. 1, the printing system comprises a printing device 110, a memory 120, a print controller 130, and a measurement interface 140.

The printing device 110 is to print a plurality of colorants to a print substrate to produce a print output 150. The print output 150 may, for example, comprise colored inks deposited on a substrate.

In 2D printing systems, the substrate may be paper, fabric, plastic or any other suitable print medium.

In 3D printing systems, the printed output may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder.

The memory 120 comprises test data 160. The test data 160 may include, for example, first test data comprising a first set of NPac vectors, which define a first set of color ramps for a set of Neugebauer Primaries available with the plurality of colorants. Each color ramp comprises a plurality of test areas, with each test area being defined by a different NPac vector. The test areas are areas of the substrate in which ink is deposited during a test print. The ramps are a series of test areas with different amounts of ink deposited per pixel (i.e. different area coverages) within each test area of the ramp. The NPac vectors for each ramp are defined by monotonically-varying vector element values for a single corresponding non-blank Neugebauer Primary.

The test data 160 may also include second test data comprising a second set of NPac vectors, which define a second set of color ramps for combinations of the set of Neugebauer Primaries. Test areas for each color ramp are defined by monotonically-varying vector element values for one Neugebauer Primary in a combination and the second set of ramps are defined by monotonically-varying vector element values across said ramps for another Neugebauer Primary in the combination. The Neugebauer Primaries are limited by the Neugebauer Primary ink use limits.

The print controller 130 receives test data 160 from the memory 120. In certain examples, the test data 160 may comprise color data as represented in an input color space, such as pixel representations in an RGB color space. The input color space may be device-dependent or colorimetric. The print controller 130 maps the color data from an input color space to an output color space for use by the printing device 110 to generate the print output 150. To do this a color mapping may be used. In certain examples, the color mapping may take the form of a look-up table (LUT) tabulating a correspondence between input color space values, such as RGB values, and output space color values, such as NPac vectors. Data points to effect this correspondence may be referred to as "nodes" of the look-up table, e.g. where a certain RGB value is mapped to a certain NPac vector. In certain cases, input in a device-dependent color space may be first mapped to a colorimetric color space, before being mapped to NPac space. The output color space may be device-dependent. Certain examples described below provide a configuration, e.g. in certain cases an optimization, of such a color mapping.

The measurement interface 140 is to receive indication of test areas that meet image quality metrics. The measurement interface 140 may transmit information regarding indicated test areas to the print controller 130. The print controller 130 may store information regarding indicated test areas in the memory 120. In some examples, the print controller 130 may, as described below, modify the color mapping based on the indicated test areas.

The print controller 130 may store, in the memory 120, ink use limits. For example, the print controller 130 may store, in the memory 120, single-ink Neugebauer Primary ink use limits based on NPac vectors for the test areas for the first set of color ramps indicated via the measurement interface 140. The print controller 130 may also store, in the memory 120, ink use limits for the printing system based on NPac vectors for the test areas for the second set of color ramps indicated via the measurement interface 140.

Figure 2:
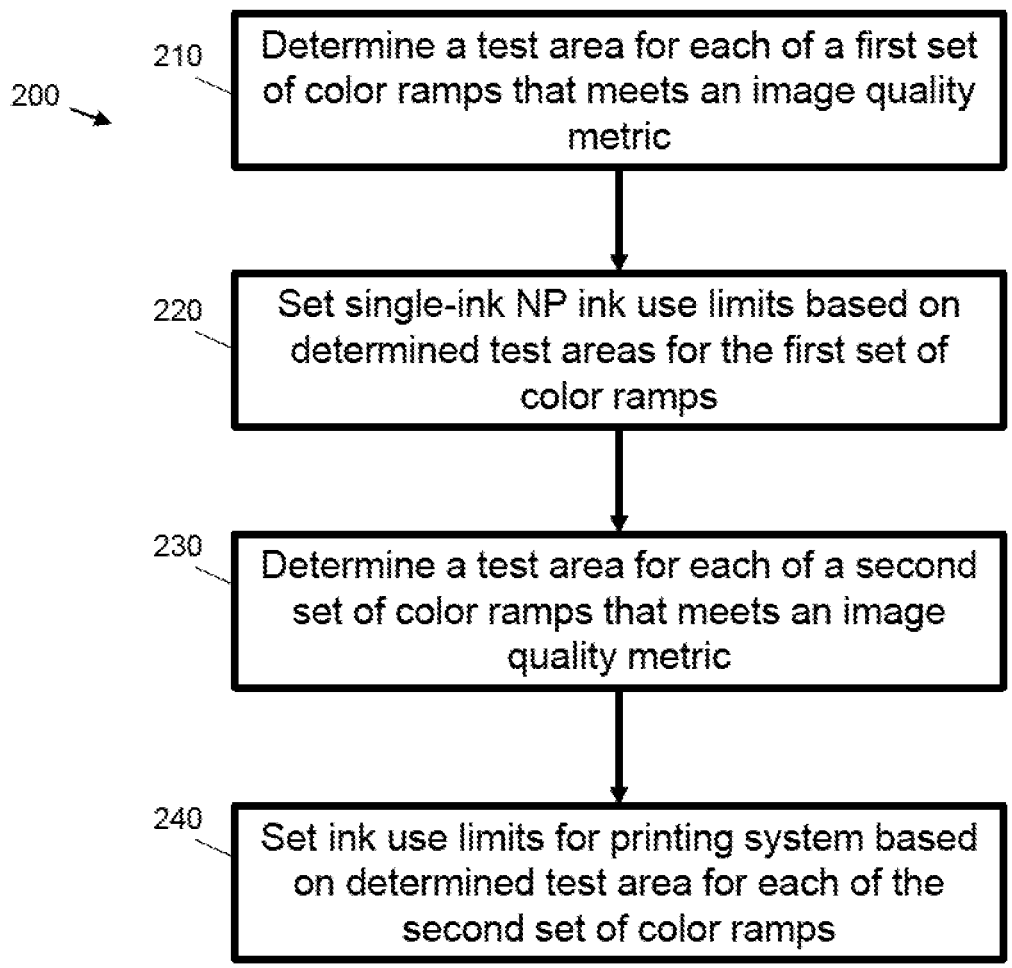
FIG. 2 is a flow diagram showing a method of setting ink use limits for a printing system according to an example.

FIG. 2 shows a method 200 of setting ink use limits for a printing system, such as the printing system described above with reference to FIG. 1.

At block 210, a test area that meets an image quality metric is determined for each of a first set of color ramps for a set of available Neugebauer Primaries, the test area for each ramp being defined by monotonically-varying vector element values for a corresponding non-blank Neugebauer Primary. For example, the test area may be determined by inspecting the ramps for test areas which exhibit characteristics related to undesirable ink-substrate interactions, which indicate that an ink coverage in the respective test area exceeds the desired ink use limits. In certain examples, the first set of color ramps may be visually inspected by a user. For example, the first set of color ramps may be inspected for mottle (I.e. the appearance of darker or lighter spots), graining, or gloss non-uniformity. In another example, the first set of color ramps may be inspected to determine test areas in which the substrate is physically deformed (e.g. wrinkling or curling of the substrate). In another example, colorimetric or other measurements of the first set of color ramps may be made to determine undesirable characteristics. For example, the hue of the resulting Neugebauer Primary may be measured. Test areas with an area coverage below the area coverages of test areas which exhibit characteristics related to undesirable ink-substrate interactions are considered to be at or within the ink use limit.

In certain examples, first set of color ramps is printed with the printing system. Each printed color ramp comprises a plurality of test areas. Each test area is printed based on a different NPac vector. The test areas for each ramp are defined by monotonically-varying element values for a single corresponding non-blank Neugebauer Primary. In other words, the ink coverage for the test areas in each ramp may step from a minimum ink coverage to a maximum coverage. The steps may be, for example, uniform steps with area coverage varying linearly. For example, for a non-blank Neugebauer primary that can be varied between 0% area coverage and 100% area coverage, a ramp comprising three test areas may include test areas with 0% area coverage (100% blank Neugebauer Primary), 50% area coverage (50% blank Neugebauer Primary) and 100% area coverage (0% blank Neugebauer Primary). In another example, a ramp comprising four test areas may include test areas with 0% area coverage (100% blank Neugebauer Primary), 33.3% area coverage (66.6% blank Neugebauer Primary), 66.6% area coverage (33.3% blank Neugebauer Primary), and 100% area coverage (0% blank Neugebauer Primary).

The first set of color ramps may be printed based on a preliminary Neugebauer Primary ink use limit. For example, the preliminary Neugebauer Primary ink use limit may be chosen that is expected to be higher than an expected ink use limit for a particular ink-substrate combination. In certain examples, a different Neugebauer Primary ink use limit may be set for each Neugebauer Primary.

The first set of color ramps may comprise ramps of single-ink and two-ink Neugebauer Primaries of the printing system.

In some examples, if the test areas in a given ramp do not exhibit characteristics related to undesirable ink-substrate interactions, a new preliminary Neugebauer Primary ink use limit may be chosen (i.e. one with a higher ink use limit). Printing of the first set of color ramps may be repeated to produce a new first set of color ramps, and block 210 may be repeated to determine a test area for each of the new first set of color ramps that meet an image quality metric.

In certain examples, if test areas which exhibit characteristics related to undesirable ink-substrate interactions are found, printing of the first set of color ramps may be repeated to print a new first set of color ramps may be printed with a lower preliminary Neugebauer Primary ink use limit. In some examples, if test areas which exhibit characteristics related to undesirable ink-substrate interactions are found, printing of the first set of color ramps may be repeated to print a new first set of color ramps may be printed with more test areas per ramp. In some examples, if test areas which exhibit characteristics related to undesirable ink-substrate interactions are found, printing of the first set of color ramps may be repeated to print a new first set of color ramps may be printed with a smaller step in area coverage. Repeating printing of the first set of color ramps in these ways, and subsequently repeating block 210 may, for example, provide a more accurate identification of ink use limits.

At block 220, Neugebauer Primary ink use limits are set based on the determined test areas for the first set of color ramps.

In some examples, in addition to setting the Neugebauer Primary ink use limits, the first set of color ramps may provide a preliminary indication of NPac choices for Neugebauer Secondaries (i.e. two single-ink Neugebauer Primaries printed in combination and with the blank Neugebauer Primary).

At block 230, a test area that meets an image quality metric is determined for each of a second set of color ramps for combinations of the set of available Neugebauer Primaries. The test areas for each ramp are defined by monotonically-varying vector element values for one Neugebauer Primary in a combination and the second set of ramps are defined by monotonically-varying vector element values across said ramps for another Neugebauer Primary in the combination, wherein the Neugebauer Primaries are limited by the respective Neugebauer Primary ink use limit. For example, the test area may be determined by inspecting the ramps for test areas which exhibit characteristics related to undesirable ink-substrate interactions, which indicate that an ink coverage in the respective test area exceeds the desired ink use limits. For example, the second set of color ramps may be inspected for mottle (I.e. the appearance of darker or lighter spots), graining, or gloss non-uniformity. In another example, the second set of color ramps may be inspected to determine test areas in which the substrate is physically deformed (e.g. wrinkling or curling of the substrate). In certain examples, inspection of grain may be important when since certain combinations of Neugebauer Primaries may result in more grainy output than others.

In certain examples, the second set of color ramps may be visually inspected by a user. In other examples, colorimetric or other measurements of the second set of color ramps may be made to determine undesirable characteristics. For example, the hue of the resulting Neugebauer Secondary may be measured. This may help to determine an appropriate balance of the use of Neugebauer Primaries in order to define a Neugebauer secondary (e.g. balancing cyan and magenta to define blue appropriately). Test areas with an area coverage below the area coverages of test areas which exhibit characteristics related to undesirable ink-substrate interactions are considered to be at or within the ink use limit.

In certain examples, the second set of color ramps for combinations of the set of available Neugebauer Primaries is printed. The test areas for each color ramp are defined by monotonically-varying vector element values for one Neugebauer Primary in a combination and the second set of ramps are defined by monotonically-varying vector element values across said ramps for another Neugebauer Primary in the combination. The result is Neugebauer Secondaries (i.e. combinations of Neugebauer Primaries and the blank Neugebauer Primary) that are defined by a cross product of the intersecting Neugebauer Primaries in each respective test area. The Neugebauer Primaries used in the combinations are limited by the Neugebauer Primary ink limits set at block 220. For example, one ramp may vary from blank media to the single Neugebauer Primary ink use limit for a first Neugebauer Primary and a second intersecting ramp may vary from blank media to the single Neugebauer Primary ink use limit of a second Neugebauer Primary. At the test area where the two ramps intersect, the area coverage of the first Neugebauer Primary and the area coverage of the second Neugebauer Primary may be computed. If the sum of the two area coverages for the two Neugebauer Primaries (at their respective drop weights) is at or below the ink-limit a valid NPac is defined.

At block 240, ink use limits for the printing system are set based on the determined test area for each of the second set of color ramps. In other words, the end result of the entire process is to obtain the following: ink-limits for each of the Neugebauer Primaries (i.e. Cyan, Magenta Yellow and Black) and ink-limits for the Neugebauer Secondaries (Red, Green, Blue) as well as the balance of Magenta and Yellow (i.e. for Red—e.g. 70% Magenta, 30% Yellow), Cyan and Yellow (i.e. for Green) and Cyan and Magenta (i.e. for Blue).

The ink use limits set at block 240 may be used in a subsequent printing operation to limit the NPac vector space available for use. For example, the ink use limits may restrict the NPac vector metamers available in the color space mapping. For example, NPac vectors falling outside of the ink use limits may be removed from a LUT representing the color mapping, e.g. removed as nodes. In other examples, the LUT may be modified to indicate that NPac vectors falling outside of the ink use limits are unavailable under certain printing conditions; for example, those NPac vectors may be unavailable when the printing system is printing on a particular type of substrate.

Figure 3:
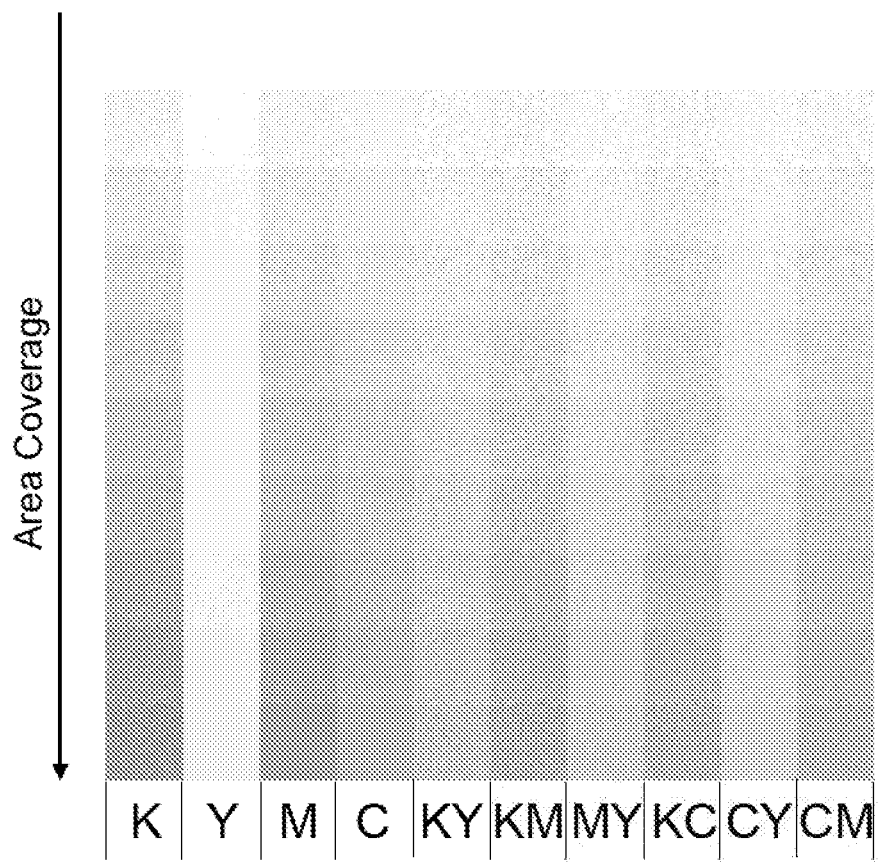
FIG. 3 is a grayscale representation of a first set of color ramps according to an example.

FIG. 3 is a grayscale representation of a first set of color ramps according to an example. The example shown in FIG. 3, is a set of ramps printed in a binary (i.e. two drop states: "drop" or "no drop") CMYK printing system. In this example, there are four single-ink Neugebauer Primaries: black (K), yellow (Y), magenta (M) and cyan (C). There are also six two-ink Neugebauer Primaries: black and yellow (KY), black and magenta (KM), magenta and yellow (MY), black and cyan (KC), cyan and yellow (CY), and cyan and magenta (CM). In printing systems with a greater or fewer number of ink channels, the number of ramps may be accordingly greater or fewer. Each of the two-ink Neugebauer Primaries is an overprint of one Neugebauer Primary with another Neugebauer Primary (i.e. a drop of one color is deposited and then a drop of another color is deposited in the same addressable print pixel).

In the example shown in FIG. 3, each ramp comprises ten test areas. The uppermost test area of each ramp (as shown in FIG. 3) has the lowest area coverage. The area coverage of the test areas increases towards the lowermost test area of each ramp. In certain examples, the ramps may be arranged in another orientation. For example, the ramps may be stepped in area coverage from left-to-right or right-to-left or in any other direction. In some examples, the test areas may be placed randomly provided their locations are known.

In this example, the difference in area coverage between adjacent test areas is uniform across each ramp. That is, there are 16 test areas and the area coverage is varied in steps of 6.67% between 0% and 100% area coverage. However, in some examples the difference in area coverage may be smaller between some adjacent test areas than between other adjacent test areas. For example, the difference in test areas may be reduced between adjacent test areas having area coverages close to an expected ink use limit (e.g. the preliminary ink use limit).

Figure 4:
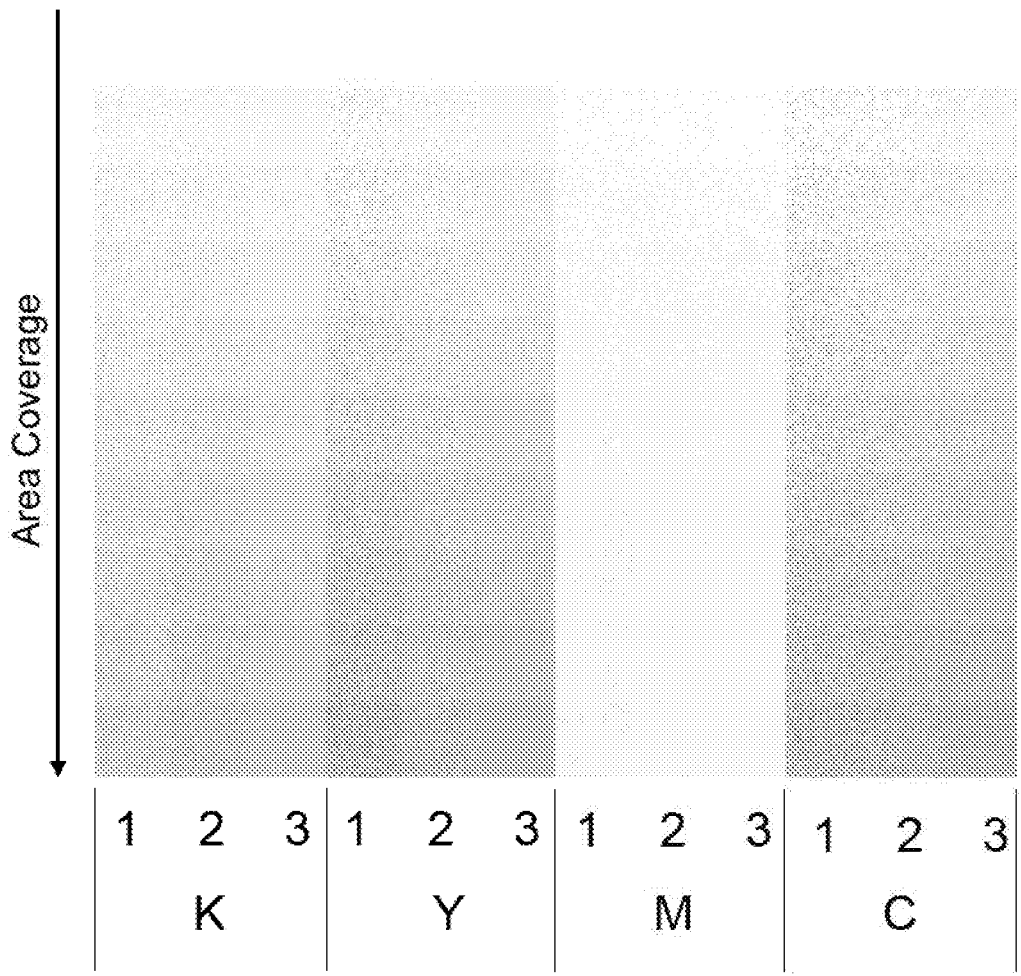
FIG. 4 is a grayscale representation of a first set of color ramps according to an example.

In some printing systems, more than one ink drop may be deposited per ink channel per print pixel. In such printing systems there are multiple single-ink Neugebauer Primaries per ink channel. FIG. 4 is a grayscale representation of a first set of color ramps for such a printing system according to an example. In this example, the printing system is capable of printing a maximum of three drops per ink channel per pixel. Similar to FIG. 3, each ramp comprises ten test areas. The uppermost test area of each ramp (as shown in FIG. 4) has the lowest area coverage. In this example, the uppermost test area is 100% blank media (i.e. 0% area coverage). The area coverage of the test areas increases towards the lowermost test area of each ramp. In this example, the area coverage of the lowermost test area of each ramp depends on the amount of ink each Neugebauer Primary uses. For example, a Neugebauer Primary may have a 3 ng drop weight and a 6 ng ink use limit and so area coverage for the lowermost test area in the ramp for that Neugebauer Primary will have an area coverage of 100%. However, in FIG. 4 there are three single-ink Neugebauer Primaries per ink, at one, two, and three drops per ink channel per pixel. In other printing systems, the number of single-ink Neugebauer Primaries per ink channel, and therefore the number of ramps printed per Neugebauer Primary, may be scaled with the number of ink drops available per ink channel per halftone pixel. For example, a Neugebauer Primary may have a 3 ng drop weight and a 6 ng ink use limit and so area coverage for the lowermost test area in the ramp for that Neugebauer Primary will have an area coverage of 66.6%. Although not shown in FIG. 4 for clarity, there will similarly be multiple two-ink Neugebauer Primaries. For example for a printing system capable of printing two drops per ink channel per halftone pixel, the cyan and magenta ink channels may contribute to combinations of one and two drops of each of cyan and magenta, resulting in CM, CMM, CCM, and CCMM Neugebauer primaries.

Figure 5:
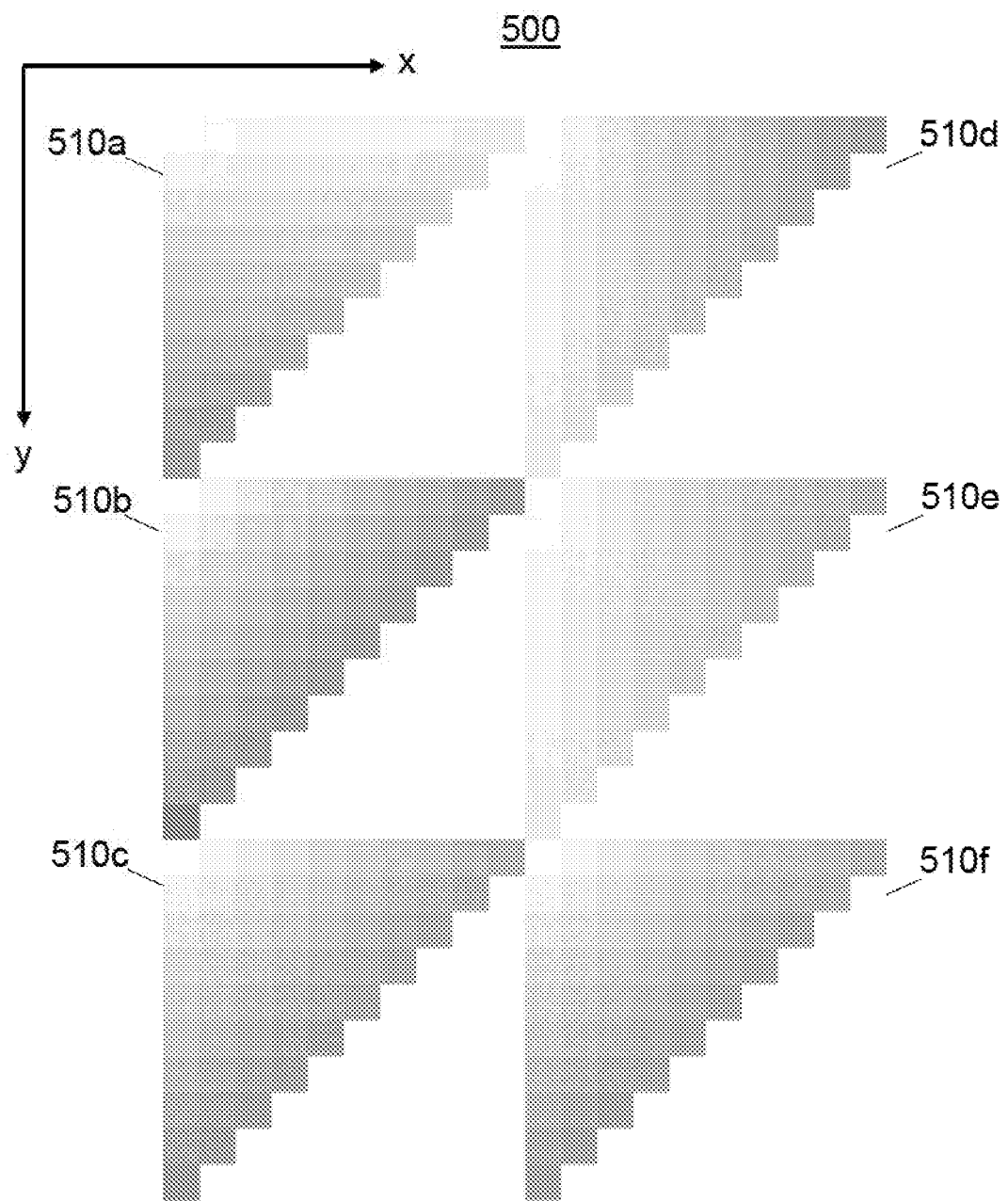
FIG. 5 is a grayscale representation of a second set of color ramps according to an example.

FIG. 5 is a grayscale representation of a second set 500 of color ramps according to an example. In this example, the second set 500 of color ramps comprises so-called squares 510a-510f of test areas. The square are a 2D array of test areas with ramps running in orthogonal directions. Each of the squares 510a-510f comprises test areas in which two single-ink Neugebauer Primaries are combined.

In the example shown in FIG. 5, there are six squares 510a-510f corresponding to combinations of single-ink Neugebauer Primaries for a four ink channel CMYK printing system. The combinations are black and yellow (KY), black and magenta (KM), black and cyan (KC), yellow and magenta (YM), yellow and cyan (YC), and magenta and cyan (MC). Each of the combinations of single-ink Neugebauer Primaries are printed side-by-side with no overprint of one single-ink Neugebauer Primary with another single-ink Neugebauer Primary. In certain examples, the print controller 130 may define control data for depositions with each combination of Neugebauer Primaries. In certain cases, the control data may include a distribution vector that specifies a distribution of Neugebauer Primary depositions, e.g. a probability distribution for each Neugebauer Primary or Neugebauer Primary combination for a pixel of a print image or, in other words, an area coverage vector for a set of Neugebauer Primary combinations or overprints. The control data may be processed via a halftoning stage such as PARAWACS or error diffusion as described above.

In each square 510a-510f, one of the Neugebauer Primaries of the combination is varied in one direction (e.g. the x direction) from no coverage to its respective Neugebauer Primary ink use limit and the other of the Neugebauer Primaries of the combination is varied in an orthogonal direction (e.g. the y direction) from no coverage to its respective Neugebauer Primary ink use limit.

A first row and a first column of each square (e.g. the leftmost column and uppermost row) correspond to the ramps printed in the first set of color ramps for the respective Neugebauer Primary. In the example shown in FIG. 5 each ramp of each square 510a-510f comprises up to ten steps, varying from no coverage to the Neugebauer Primary ink use limit. Furthermore, test areas for which a global ink use limit (i.e. based on a total amount of ink of the Neugebauer Primaries of the combination) is exceeded are not printed, which is why the not all test areas of the square 510a-510f are printed. In certain examples, the number of steps may be different. At the diagonal line of test areas extending from the bottom left test area (i.e. the Neugebauer Primary ink use limit for one of the Neugebauer Primaries of the combination) to the top right test area (i.e. the Neugebauer Primary ink use limit for the other of the Neugebauer Primary of the combination) each of the Neugebauer Primaries of the combination is at its respective Neugebauer Primary ink use limit. All test areas above and to the left of this line are printed such that each of the Neugebauer Primaries has an area coverage below its respective Neugebauer Primary ink use limit. For example, each Neugebauer Primary may have a drop weight of 6 ng and a single Neugebauer Primary ink use limit of 6 ng. In such an example, each ramp can be varied between 0% area coverage (i.e. blank media) and 100% area coverage, in which case the diagonal line of test areas extending from the bottom left test area (i.e. the Neugebauer Primary ink use limit for one of the Neugebauer Primaries of the combination) to the top right test area (i.e. the Neugebauer Primary ink use limit for the other of the Neugebauer Primary of the combination) comprises test areas which varies monotonically from 100% area coverage of one Neugebauer Primary to 100% area coverage of another Neugebauer Primary. In these test areas, the combination of Neugebauer Primaries is printed such that the dots of the individual Primaries are printed side-by-side (i.e. there is no overprinting).

Figure 6:
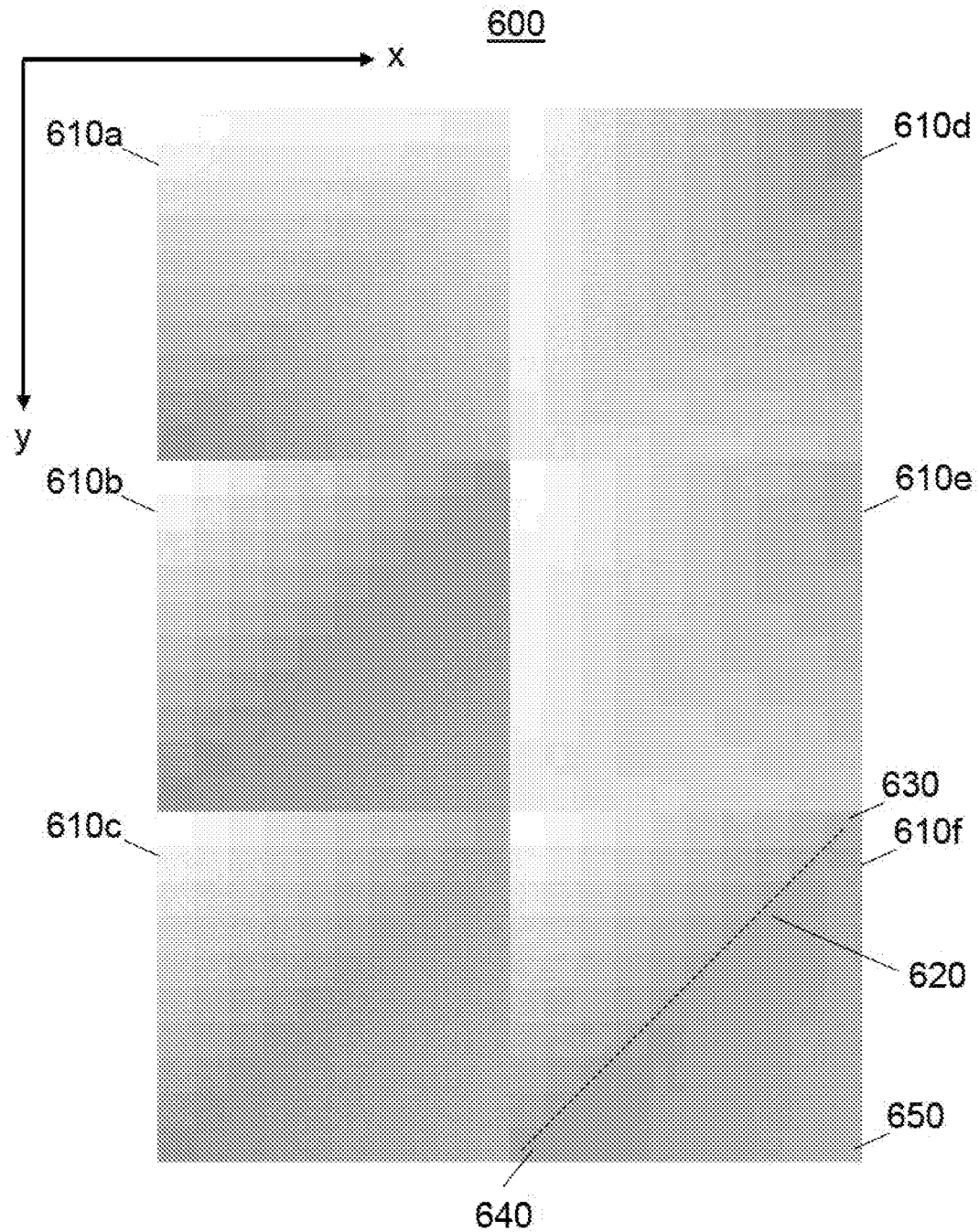
FIG. 6 is a grayscale representation of a second set of color ramps according to an example.

FIG. 6 is a grayscale representation of a second set 600 of color ramps according to an example. Similar to FIG. 5, there are six squares 610a-610f corresponding to combinations of single-ink Neugebauer Primaries for a four ink channel CMYK printing system. As in FIG. 5, in the upper left portion of each square, one of the Neugebauer Primaries of the combination is varied in one direction (e.g. the x direction) from no coverage to its respective Neugebauer Primary ink use limit and the other of the Neugebauer Primaries of the combination is varied in an orthogonal direction (e.g. the y direction) from no coverage to its respective Neugebauer Primary ink use limit. In the upper left portion of each square, each test area comprises combinations of Neugebauer Primaries that are printed side-by-side with no overprint.

The test areas above and left of the diagonal line 620 of test areas extending from the bottom left test area (i.e. the Neugebauer Primary ink use limit for one of the Neugebauer Primaries of the combination) to the top right test area (i.e. the Neugebauer Primary ink use limit for the other of the Neugebauer Primary of the combination) represent combinations of Neugebauer Primaries that are printed side-by-side with each of the Neugebauer Primaries having an area coverage below its respective Neugebauer Primary ink use limit. The test areas below and to the right of the diagonal line 620 of test areas extending from the bottom left test area (i.e. the Neugebauer Primary ink use limit for one of the Neugebauer Primaries of the combination) to the top right test area (i.e. the Neugebauer Primary ink use limit for the other of the Neugebauer Primary of the combination) represent combinations of two-ink combinations printed side-by-side at the ink limit and the corresponding two-ink Neugebauer Primary (i.e. two inks overprinted).

Figure 7:
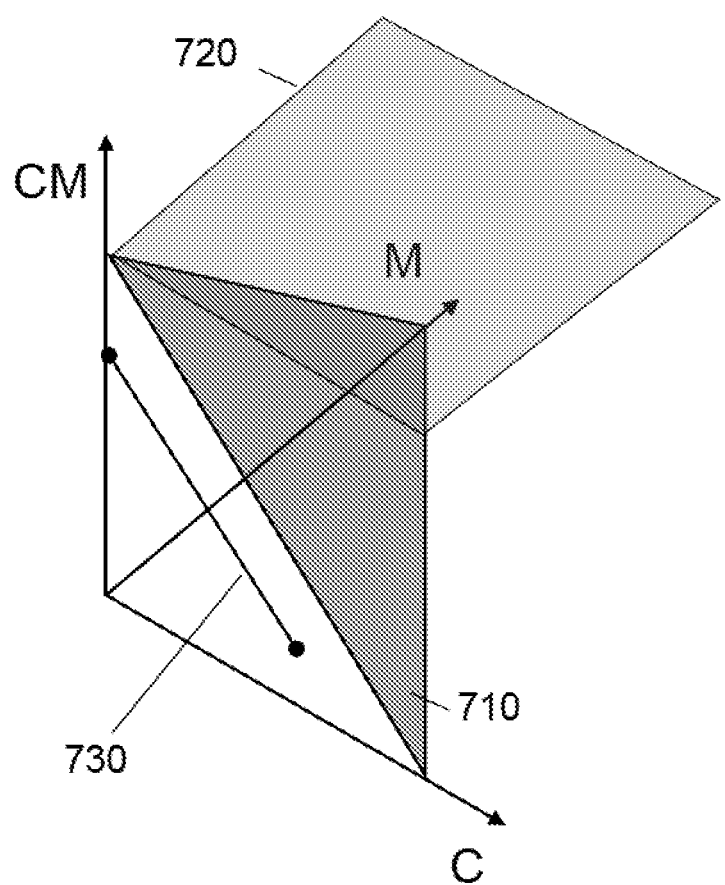
FIG. 7 is a representation of a Neugebauer Primary color space according to an example.

In the example shown in FIG. 6, the combination is varied from 100% side-by-side printed color (i.e. two single-ink Neugebauer Primaries printed in combination) at the bottom left test area 630 and top right test area 640 of each square 610a-610f, to 100% overprinted color (i.e. a two-ink Neugebauer Primary) at the bottom right test area 650 of each square 610a-610f. For example, for cyan and magenta, the combination is varied from no overprinted CM Neugebauer Primary and 100% magenta at the bottom left test area 630 to 100% CM Neugebauer Primary at the bottom right test area 650 and from no overprinted CM Neugebauer Primary and 100% cyan at the top right test area 630 to 100% CM Neugebauer Primary at the bottom right test area 650. Between these extremes the test areas comprise various combinations of cyan (C) and magenta (M) single-ink Neugebauer Primary in combinations with CM Neugebauer Primary. This allows for a choice of secondary (i.e. a combination of single-ink channels) that combines different relative proportions of side-by-side half toned color and overprinted color. The space in which this variation occurs is depicted for in FIG. 7 as a plane 710 extending between the ink use limits for each of the single-ink Neugebauer Primaries (C and M) and the CM two-ink Neugebauer Primary.

The sets of color ramps described above with reference to FIGS. 3 to 6 may be used to set ink use limits for a printing system. For example, the charts may be used to set ink limits when a new substrate type is to be used in the printing system. This may provide for a more flexible printing system in which a wide variety of substrates, each of which may absorb ink differently (e.g. due to different substrate thickness, the presence of coatings, and different finishes), can be printed without the properties of all of the substrates to be known and tested during development or installation. For example, it may enable new substrates, not previously printed on by the printing system, to be tested and ready for printing quickly and efficiently.

In some examples, further sets of color ramps may be printed to extend the testing of the Neugebauer Primary space further.

In a certain example, the relative proportion of overprinted (i.e. multi-ink Neugebauer Primary) ink to combined single-ink Neugebauer Primary may be fixed and the relative proportions of the single-ink Neugebauer Primary may be varied. For example, in the case of a combination of cyan and magenta, this is equivalent to a plane 720 in the CM axis of FIG. 7.

In another example, once a test area that meets an image quality metric has been identified for two single-ink Neugebauer Primaries in combination (e.g. from a set of ramps such as those depicted in FIGS. 5 and 6), and a test area that meets an image quality metric has been identified for a corresponding two-ink Neugebauer Primary (e.g. from one of the ramps depicted in FIGS. 3 and 4), a ramp may be printed that transitions between the NPac vectors of the two test areas. For example, in the case of a combination of cyan and magenta, this is equivalent to transitioning along a line 730 that at one end has non-zero values of C and M and lies in the CM=0 plane and at the other end has C=0 and M=0) and a non-zero CM value. In some examples, this may be done for each combination of single-ink Neugebauer Primaries.

Figure 8:
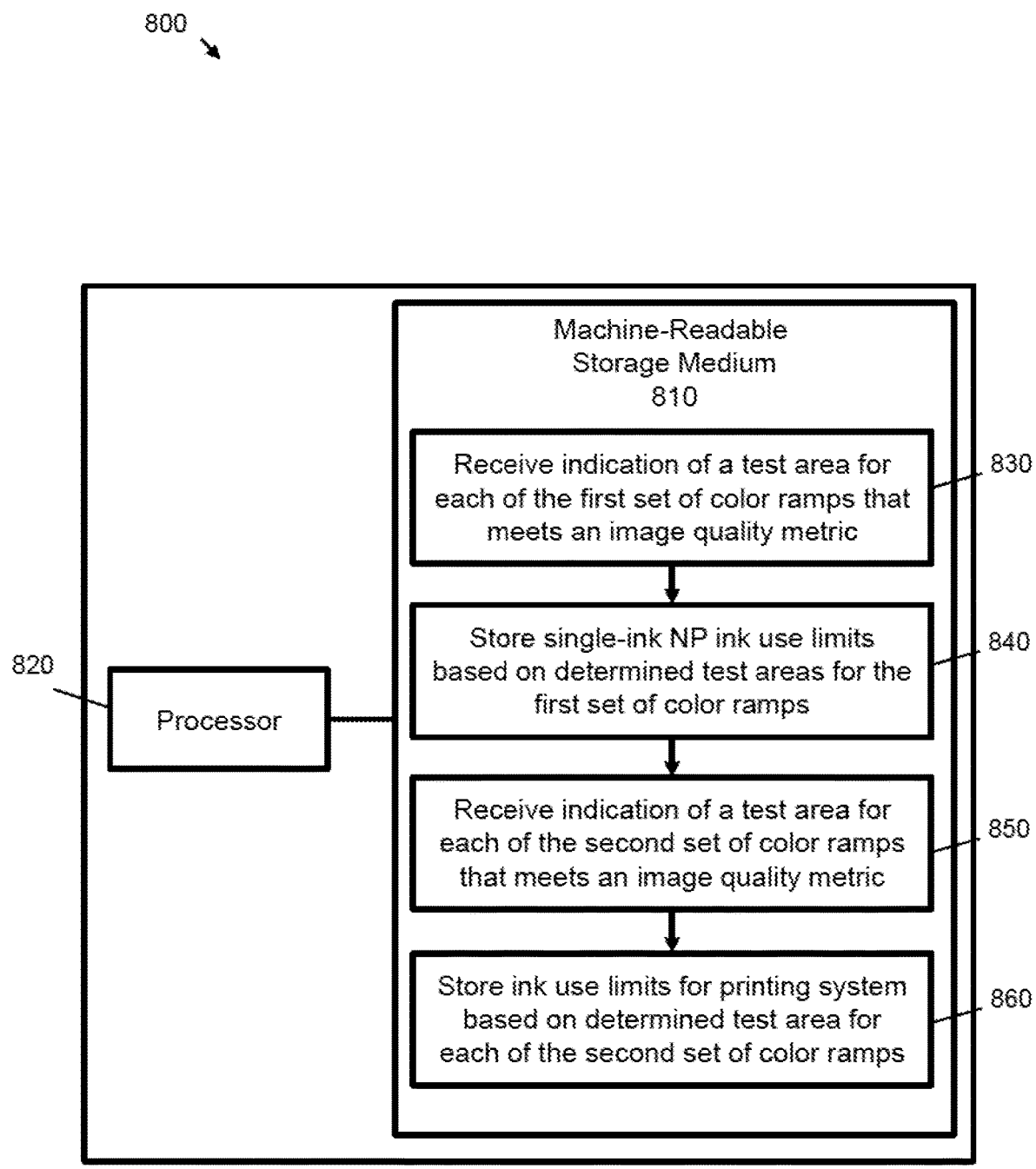
FIG. 8 is a schematic diagram showing a processing device according to an example.

As described above, certain methods and systems as described herein may be implemented by a processor that processes computer program code that is retrieved from a non-transitory storage medium. For example, the method 200 may be implemented by computer program code that is implemented by a computing device, including a processor of a computing system embedded in a printing device. In this context, FIG. 8 shows an example of a processing device 800 comprising a machine-readable storage medium 810 coupled to a processor 820. In certain case the processing device 800 may comprise a stand-alone computing device, such as a desktop computer or server communicatively coupled to an imaging device; in other cases the processing device 800 may comprise part of a printing device or the like. The machine-readable medium 810 can be any medium that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises program code to implement the methods described above.

At block 830, an indication of a test area for each of a first set of color ramps that meets at least one image quality metric is received. For example, the indication may be received at the measurement interface 140.

In certain examples, a first print operation is effected to produce the first set of color ramps for a set of available Neugebauer Primaries, each color ramp comprising a plurality of test areas, each test area being printed based a different NPac vector, wherein the test areas for each ramp are defined by monotonically-varying vector element values for a single corresponding non-blank Neugebauer Primary.

At block 840, Neugebauer Primary ink use limits based on the determined test areas for the first set of color ramps are stored. For example, the single-ink Neugebauer Primary ink use limits may be stored in the memory 120 by the print controller 130.

At block 850, an indication of a test area for each of a second set of color ramps that meets at least one image quality metric is received. For example, the indication may be received at the measurement interface 140.

In certain examples, a second print operation is effected to produce the second set of color ramps for combinations of the set of available Neugebauer Primaries, wherein the test areas for each ramp are defined by monotonically-varying vector element values for one Neugebauer Primary in a combination and the second set of ramps are defined by monotonically-varying vector element values across said ramps for another Neugebauer Primary in the combination, wherein the Neugebauer Primaries are limited by the Neugebauer Primary ink use limits.

At block 860, ink use limits for the printing system based on the indicated test areas for each of the second set of color ramps are stored. For example, the ink use limits for the printing system 100 may be stored in the memory 120 by the print controller 130.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of setting ink use limits for a printing system in which color is expressed using Neugebauer Primaries, the method comprising:
   determining a number of test areas for each of a first set of color ramps for a set of available Neugebauer Primaries that meet an image quality metric, wherein the test areas for each ramp are defined by monotonically-varying vector element values for a corresponding non-blank Neugebauer Primary;

setting ink use limits based on the determined test areas for the first set of color ramps;

determining a number of test areas for each of a second set of color ramps for combinations of the available Neugebauer Primaries that meet an image quality metric, wherein the test areas for each ramp are defined by monotonically-varying vector element values for one Neugebauer Primary in a combination and the second set of ramps are defined by monotonically-varying vector element values across said ramps for another Neugebauer Primary in the combination; and setting additional ink use limits for the printing system based on the determined test area for each of the second set of color ramps.

2. The method of claim 1, comprising setting a preliminary ink use limit in terms of a Neugebauer Primary and printing one of the test areas in each of the first set of color ramps at the preliminary ink use limit.

3. The method of claim 2, comprising:

in response to determining that none of the test areas in a ramp of the first set of color ramps meets the image quality metric, modifying the preliminary primary ink use limit and printing a new first set of color ramps; and setting ink use limits based on the determined test areas for the new first set of color ramps.

4. The method of claim 2, comprising:

following a determination that a test area for each of the first set of color ramps meets the image quality metric, modifying a difference between the monotonically-varying vector element values and printing a new first set of color ramps; and setting the ink use limits based on the determined test areas for the new first set of color ramps.

5. The method of claim 1, wherein the first set of color ramps comprises ramps of single-ink Neugebauer Primaries and ramps of multiple-ink Neugebauer Primaries.

6. The method of claim 5, comprising setting preliminary ink use limits for the printing system based on the determined test area for each of the ramps of two-ink Neugebauer Primaries.

7. The method of claim 1, wherein the second set of color ramps comprises a two-dimensional array of test areas, wherein one Neugebauer Primary of the combination is monotonically varied in one dimension of the two-dimensional array and the other Neugebauer Primary of the combination is monotonically varied in an orthogonal dimension of the two-dimensional array.

8. The method of claim 1, wherein test areas of the second set of color ramps are not printed if the combination of the Neugebauer Primaries exceeds a global ink use limit comprising a combination of the ink use limits.

9. The method of claim 1, wherein the second set of color ramps comprises test areas comprising a combination of single-ink Neugebauer Primaries printed adjacent one another and test areas comprising combined single-ink Neugebauer Primaries printed in combination with two-ink Neugebauer Primaries.

10. The method of claim 1, wherein the image quality metric is one of: hue, chroma, grain, coalescence and mottle.

11. The method of claim 1, wherein the ink use limits define an amount of ink that can be printed to a substrate.

12. The method of claim 1, wherein each ramp comprises ten test areas.

13. The method of claim 1, further comprising setting per-colorant ink use limits.

14. The method of claim 1, further comprising setting a total ink use limit for all colorants applied.

15. The method of claim 1, further comprising repeating the method of claim 1 when a new substrate type is being used by the printing system.

16. A printing system comprising:

a printing device to print a plurality of colorants onto a print substrate;

a memory comprising:

first test data comprising a first set of Neugebauer Primary Area Coverage vectors, said first test data defining a first set of color ramps for a set of Neugebauer Primaries available with the plurality of colorants, each color ramp comprising a plurality of test areas, each test area being defined based on a different Neugebauer Primary Area Coverage vector, wherein the Neugebauer Primary Area Coverage vectors for each ramp are defined by monotonically-varying vector element values for a single corresponding non-blank Neugebauer Primary;

a print controller to print the first set of color ramps according to the first test data; and a measurement interface to receive an indication of a test area for each of the first set of color ramps that meets at least one image quality metric;

wherein the print controller is configured to store, in the memory, Neugebauer Primary ink use limits based on the test areas for the first set of color ramps indicated via the measurement interface, wherein the memory further comprises:

second test data comprising a second set of Neugebauer Primary Area Coverage vectors, said second test data defining a second set of color ramps for combinations of the set of Neugebauer Primaries, wherein the test areas for each ramp are defined by monotonically-varying vector element values for one Neugebauer Primary in a combination and the second set of ramps are defined by monotonically-varying vector element values across said ramps for another Neugebauer Primary in the combination, wherein the Neugebauer Primaries are limited by the Neugebauer Primary ink use limits, wherein the print controller is configured to print the second set of color ramps according to the second test data, wherein the measurement interface is configured to receive an indication of a test area for each of the second set of color ramps that meets at least one image quality metric, and wherein the print controller is configured to store, in the memory, ink use limits for the printing system based on the test areas for the second set of color ramps indicated via the measurement interface.

17. The printing system of claim 16, wherein the first set of color ramps comprises ramps of single-ink Neugebauer Primaries and ramps of two-ink Neugebauer Primaries.

18. The printing system of claim 17, comprising setting preliminary ink use limits for the printing system for a test area for each of the ramps of two-ink Neugebauer Primaries.

19. The printing system of claim 16, the printing system further comprising a Halftone Area Neugebauer Separation (HANS) pipeline.

20. A non-transitory machine-readable storage medium storing instructions that, when executed by a processor in a printing device, cause the processor to:

receive an indication of a test area for each of a first set of color ramps for a set of available Neugebauer Primaries that meets at least one image quality metric, wherein the test area for each ramp are defined by monotonically-varying vector element values for a corresponding non-blank Neugebauer Primary;

store Neugebauer Primary ink use limits based on the determined test areas for the first set of color ramps;

receive an indication of a test area for each of a second set of color ramps for combinations of the set of available Neugebauer Primaries that meets at least one image quality metric, wherein the test areas for each ramp are defined by monotonically-varying vector element values for one Neugebauer Primary in a combination and the second set of ramps are defined by monotonically-varying vector element values across said ramps for another Neugebauer Primary in the combination, wherein the Neugebauer Primaries are limited by the respective Neugebauer Primary ink use limits; and store ink use limits for the printing system based on the indicated test areas for each of the second set of color ramps.

* * * * *